(12) United States Patent
Zhang et al.

(10) Patent No.: US 7,515,388 B2
(45) Date of Patent: *Apr. 7, 2009

(54) COMPOSITE HARD BIAS DESIGN WITH A SOFT MAGNETIC UNDERLAYER FOR SENSOR APPLICATIONS

(75) Inventors: Kunliang Zhang, Milpitas, CA (US); Mao-Min Chen, S. J., CA (US); Chyu-Jiuh Torng, Pleasanton, CA (US); Min Li, Dublin, CA (US); Chen-Jung Chien, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 469 days.

This patent is subject to a terminal disclaimer.

(21) Appl. No.: 11/016,506

(22) Filed: Dec. 17, 2004

(65) Prior Publication Data

US 2006/0132988 A1    Jun. 22, 2006

(51) Int. Cl.
   *G11B 5/33*   (2006.01)
   *G11B 5/127*  (2006.01)
(52) U.S. Cl. .................. 360/324.12; 29/603.07
(58) Field of Classification Search ...... 360/324–324.2, 360/327–327.3; 324/207.21, 252; 338/32 R; 29/603.07
   See application file for complete search history.

(56) References Cited

U.S. PATENT DOCUMENTS

| 5,739,987 | A  | * | 4/1998  | Yuan et al.      | 360/327.32 |
|-----------|----|---|---------|------------------|------------|
| 6,118,624 | A  |   | 9/2000  | Fukuzawa et al.  | 360/113    |
| 6,185,081 | B1 |   | 2/2001  | Simion et al.    | 360/327.3  |
| 6,324,037 | B1 | * | 11/2001 | Zhu et al.       | 360/324.12 |
| 6,449,135 | B1 |   | 9/2002  | Ding et al.      | 360/327.31 |
| 6,483,674 | B1 | * | 11/2002 | Kanai et al.     | 360/324.12 |
| 6,577,477 | B1 | * | 6/2003  | Lin              | 360/324.12 |
| 6,587,316 | B2 |   | 7/2003  | Hasegawa         | 360/324.1  |
| 6,656,604 | B2 |   | 12/2003 | Hasewaga         | 428/611    |
| 6,661,627 | B1 |   | 12/2003 | Kadokawa         | 360/327.3  |
| 6,667,493 | B2 |   | 12/2003 | Ooshima          | 257/49     |
| 6,690,554 | B2 |   | 2/2004  | Aoki et al.      | 360/324.12 |

(Continued)

OTHER PUBLICATIONS

Co-pending U.S. Appl. No. 10/868,716, filed Jun. 15, 2004, "A Novel Hard Bias Design for Extra High Density Recording", Assigned to the Same Assignee.

(Continued)

*Primary Examiner*—Brian E Miller
(74) *Attorney, Agent, or Firm*—Saile Ackerman LLC; Stephen B. Ackerman (57) ABSTRACT

A hard bias structure for biasing a free layer in a MR element within a magnetic read head is comprised of a soft magnetic underlayer such as NiFe and a hard bias layer comprised of $Co_{78.6}Cr_{5.2}Pt_{16.2}$ or $Co_{65}Cr_{15}Pt_{20}$ that are rigidly exchange coupled to ensure a well aligned longitudinal biasing direction with minimal dispersions. The hard bias structure is formed on a BCC seed layer such as CrTi to improve lattice matching. The hard bias structure may be laminated in which each of the underlayers and hard bias layers has a thickness that is adjusted to optimize the total $H_C$, $M_r t$, and S values. The present invention encompasses CIP and CPP spin values, MTJ devices, and multi-layer sensors. A larger process window for fabricating the hard bias structure is realized and lower asymmetry output and NBLW (normalized base line wandering) reject rates during a read operation are achieved.

18 Claims, 3 Drawing Sheets

U.S. PATENT DOCUMENTS

| | | | |
|---|---|---|---|
| 6,704,175 B2 * | 3/2004 | Li et al. | 360/324.11 |
| 6,798,620 B2 * | 9/2004 | Hiramoto et al. | 360/321 |
| 6,807,034 B2 | 10/2004 | Hasegawa et al. | 360/324.2 |
| 6,903,906 B2 * | 6/2005 | Morinaga et al. | 360/324.12 |
| 6,944,939 B2 * | 9/2005 | Guo et al. | 29/603.15 |
| 7,016,165 B2 * | 3/2006 | Chien et al. | 360/324.12 |
| 7,016,166 B1 * | 3/2006 | Hou et al. | 360/324.12 |
| 7,446,987 B2 * | 11/2008 | Zhang et al. | 360/324.12 |
| 2002/0015268 A1 * | 2/2002 | Mao et al. | 360/324.12 |
| 2002/0181171 A1 * | 12/2002 | Chien et al. | 360/324.12 |
| 2002/0191348 A1 * | 12/2002 | Hasegawa et al. | 360/314 |
| 2003/0227725 A1 * | 12/2003 | Macken et al. | 360/324.12 |
| 2004/0105192 A1 | 6/2004 | Chien et al. | 360/324.1 |
| 2005/0275975 A1 * | 12/2005 | Zhang et al. | 360/324.12 |
| 2006/0132988 A1 * | 6/2006 | Zhang et al. | 360/324.12 |
| 2006/0132989 A1 * | 6/2006 | Zhang et al. | 360/324.12 |

OTHER PUBLICATIONS

Co-pending U.S. Appl. No. 11/016,507, filed Dec. 17 2004, A Novel Hard Bias Design for Sensor Applications, Assigned to the Same Assignee.

* cited by examiner

COMPOSITE HARD BIAS DESIGN WITH A SOFT MAGNETIC UNDERLAYER FOR SENSOR APPLICATIONS

RELATED PATENT APPLICATION

This application is related to the following: Ser. No. 10/868,716, filing date Jun. 15, 2004; and Ser. No. 11/016,507, filing date Dec. 17, 2004; all assigned to a common assignee.

FIELD OF THE INVENTION

The invention relates to an improved hard bias structure formed adjacent to a giant magnetoresistive (GMR) sensor in a magnetic read head and a method for making the same. In particular, a soft magnetic underlayer is coupled with an adjoining hard bias layer to reduce biasing dispersions at an abutting junction with a free layer and improve the output signal and asymmetry sigma in a read operation.

BACKGROUND OF THE INVENTION

In a magnetic recording device in which a read head is based on a spin valve magnetoresistance (SVMR) or a giant magnetoresistance (GMR) effect, there is a constant drive to increase recording density. One method of accomplishing this objective is to decrease the size of the sensor element in the read head that is suspended over a magnetic disk on an air bearing surface (ABS). The sensor is a critical component in which different magnetic states are detected by passing a sense current there through and monitoring a resistance change. The popular GMR configuration includes two ferromagnetic layers which are separated by a non-magnetic conductive layer in the sensor stack. One of the ferromagnetic layers is a pinned layer wherein the magnetization direction is fixed by exchange coupling with an adjacent anti-ferromagnetic (AFM) pinning layer. The second ferromagnetic layer is a free layer wherein the magnetization vector can rotate in response to external magnetic fields. In the absence of an external magnetic field, the magnetization direction of the free layer is aligned perpendicular to that of the pinned layer by the influence of abutting hard bias layers on opposite sides of the sensor stack. When an external magnetic field is applied by passing the sensor over a recording medium on the ABS, the free layer magnetic moment may rotate to a direction which is parallel to that of the pinned layer.

A sense current is used to detect a resistance value which is lower when the magnetic moments of the free layer and pinned layer are in a parallel state. In a CPP configuration, a sense current is passed through the sensor in a direction perpendicular to the layers in the sensor stack. Alternatively, there is a current-in-plane (CIP) configuration where the sense current passes through the sensor in a direction parallel to the planes of the layers in the sensor stack.

Ultra-high density (over 100 Gb/in$^2$) recording requires a highly sensitive read head in which the cross-sectional area of the sensor is typically smaller than 0.1×0.1 microns at the ABS plane. Current recording head applications are typically based on an abutting junction configuration in which a hard bias layer is formed adjacent to each side of a free layer in a GMR spin valve structure. As the recording density further increases and track width decreases, the junction edge stability becomes more important so that edge demagnification in the free layer must be reduced. In other words, horizontal (longitudinal) biasing is necessary so that a single domain magnetization state in the free layer will be stable against all reasonable perturbations while the sensor maintains relatively high signal sensitivity.

In longitudinal biasing read head design, films of high coercivity material are abutted against the edges of the GMR sensor and particularly against the sides of the free layer. By arranging for the flux flow in the free layer to be equal to the flux flow in the adjoining hard bias layer, the demagnetizing field at the junction edges of the aforementioned layers vanishes because of the absence of magnetic poles at the junction. As the critical dimensions for sensor elements become smaller with higher recording density requirements, the minimum longitudinal bias field necessary for free layer domain stabilization increases.

A high coercivity in the in-plane direction is needed in the hard bias layer to provide a stable longitudinal bias that maintains a single domain state in the free layer and thereby avoids undesirable Barkhausen noise. This condition is realized when there is a sufficient in-plane remnant magnetization ($M_r$) which may also be expressed as $M_r t$ since $M_r$ is dependent on the thickness (t) of the hard bias layer. $M_r t$ is the component that provides the longitudinal bias flux to the free layer and must be high enough to assure a single magnetic domain in the free layer but not so high as to prevent the magnetic field in the free layer from rotating under the influence of a reasonably sized external magnetic field. Moreover, a high squareness (S) hard bias material is desired. In other words, $S=M_r/M_S$ should approach 1 where $M_S$ represents the magnetic saturation value.

Figure 1:
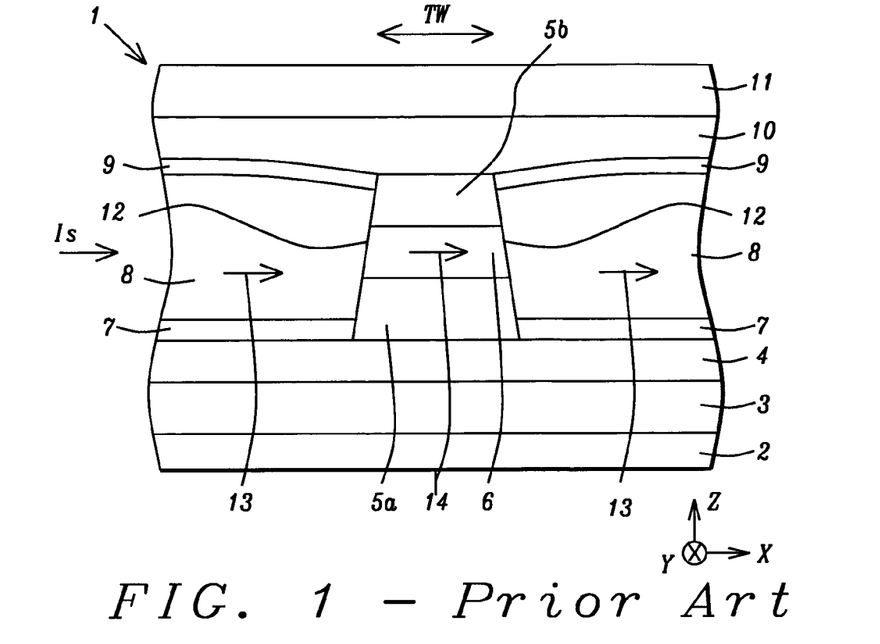
FIG. 1 is a cross-sectional view showing a prior art magnetic read head with a GMR element, a seed layer formed on a gap layer and along a portion of the sidewalls of the GMR element, and a hard bias layer on the seed layer.

Referring to FIG. 1, a conventional read head 1 based on a GMR sensor configuration is shown and is comprised of a substrate 2 upon which a first shield layer 3 and a first gap layer 4 are formed. There is a GMR element comprised of a bottom portion 5a, a free layer 6, and a top portion 5b formed on the first gap layer 4. Note that the GMR element generally has sloped sidewalls wherein the top portion 5b is not as wide as the bottom portion 5a. The GMR element may be a bottom spin valve in which an AFM layer and pinned layer (not shown) are in the bottom portion 5a or the GMR element may be a top spin valve where the AFM layer and pinned layer are in the top portion 5b. There is a seed layer 7 formed on the first gap layer 4 and along the GMR element which ensures that the subsequently deposited hard bias layers 8 have a proper microstructure. Hard bias layers 8 form an abutting junction 12 on either side of the free layer 6. Leads 9 are provided on the hard bias layers 8 to carry current to and from the GMR element. The distance between the leads 9 defines the track width TW of the read head 1. Above the leads 9 and GMR element are successively formed a second gap layer 10 and a second shield layer 11.

The pinned layer in the GMR element is pinned in the Y direction by exchange coupling with an adjacent AFM layer that is magnetized in the Y direction by an annealing process. The hard bias layers 8 which are made of a material such as CoCrPt or CoPt are magnetized in the X direction as depicted by vectors 13 and influence an X directional alignment of the magnetic vector 14 in the free layer 6. When a magnetic field of sufficient strength is applied in the Y direction from a recording medium by moving the read head 1 over a hard disk (not shown) in the Z direction, then the magnetization in the free layer switches to the Y direction. This change in magnetic state is sensed by a voltage change due to a drop in the electrical resistance for an electrical current that is passed through the GMR element. In a CIP spin valve, this sense current $I_S$ is in a direction parallel to the planes of the sensor stack.

One concern about the output signal from a GMR element during a feed back (read) operation is that the asymmetry sigma should be as small as possible in order to accurately reproduce the waveform from the recording medium. Asymmetry is determined by the variable magnetization direction of the free layer. Ideally, the magnetic moment 14 of the free layer 6 is orthogonal to the magnetic moment of the pinned layer when no external magnetic field is present. However, the actual angle between the aforementioned magnetic moments usually deviates somewhat from 90° because of other magnetic forces in the GMR element and thereby produces an asymmetric waveform in the output.

Another concern is that CoPt or CoCrPt films which have been used as the biasing layer for magnetic recording for quite some time have a large intrinsic anisotropy. As a result, the easy axes of the hard bias layers tend to distribute randomly along the junction edge because of a tapered junction shape caused by the shadowing effect of a photoresist mask during sensor fabrication. Thus, the biasing direction will become randomized along the junction edge and thereby decrease the biasing strength and efficiency. In other words, dispersions in biasing strength are formed and must be reduced to achieve a high performance sensor element.

To improve the hard bias design, it is desirable to have a well aligned hard bias layer or to find some way to align the biasing direction of the hard bias layer, especially along the sloped wall of the junction. One effective way of aligning the hard biasing direction is to make use of exchange coupling between a magnetic underlayer and a hard bias layer. As a result, signal stability is significantly improved while maintaining high sensor sensitivity. Because an underlayer such as FeCoMo has a magnetization that is very high compared with a typical hard bias layer and its magnetic softness is not as low as desired, a new soft underlayer material and a new hard bias structure are necessary for the next generation recording head. In other words, a low softness underlayer is desirable since it has fewer easy axis dispersions which lead to improved alignment of the hard bias structure at the abutting junctions.

Other related art is found in U.S. Pat. No. 6,118,624 where a hard biasing configuration consisting of a high saturation magnetization layer such as CoPt or CoCrPt on a hard magnetic layer like $Fe_{85}Co_{15}$ is described. Unfortunately, the high magnetic saturation of FeCo alloys generally leads to undesirably high magnetostriction.

A method of suppressing dispersions in a magnetic recording device is disclosed in U.S. Pat. No. 6,661,627 wherein a solenoid is used to adjust a magnetic field running in a longitudinal bias direction. Therefore, a constant effective track width and optimum signal output can be obtained. However, the method for fabricating this device appears to be complicated and expensive.

Improved lattice matching is achieved in U.S. Pat. No. 6,577,477 by inserting a CrCoTa buffer layer between a seed layer of CrTi or Cr and a hard bias layer that is CoPt or CoCrPt. In U.S. Patent Application 2004/0105192, a thin NiCr, Ni, Fe, or Cr film is inserted between the seed layer and an antiferromagnetic (AFM) layer to screen out structural distortion resulting from the long junction tail of a bottom spin valve structure. An interlayer comprised of Cr, CrV, or CoCrTa is formed between a seed layer and hard bias layer in U.S. Pat. No. 6,185,081 to promote in-plane c-axis growth of Co in the hard bias layer.

In U.S. Pat. No. 6,807,034, a bias underlayer formed on an insulating layer in a CPP dual spin valve configuration is preferably a metal film with a body centered cubic (BCC) crystal structure in which the (110) plane is preferably oriented. Related U.S. Pat. Nos. 6,656,604 and 6,587,316 describe bias underlayers with a BCC structure and made of Cr, Ti, Mo, or WMo that separate an AFM layer from an overlying hard bias layer and enable the magnetization easy axis of the hard bias layer to be planar oriented and the hard bias magnetic field to be intensified.

A metal buffer layer formed on an AFM layer and along the sides of a free layer in an MR element is disclosed in U.S. Pat. No. 6,690,554 and increases the magnetic strength of an overlying hard bias layer.

In U.S. Pat. No. 6,667,493, bias underlayers formed of a non-magnetic material (Cr, W, Mo, V, Mn, Nb, or Ta) have sidewall portions formed along the sides of a multilayer film and base portions formed on a substrate wherein the thickness of the sidewall portions that contact the free layer is greater than that of the base portions.

A Sendust-type alloy is employed as an underlayer for a hard bias layer in U.S. Pat. No. 6,449,135.

SUMMARY OF THE INVENTION

One objective of the present invention is to provide a hard bias structure in which the longitudinal biasing dispersions are reduced at an abutting junction with a free layer in a magnetoresistive (MR) element.

A further objective of the present invention is to provide a hard bias structure for biasing a free layer in a GMR sensor device that improves the output signal, asymmetry sigma, and head noise (edge domain noise, etc.) which is measured by the normalized base line wandering (NBLW) reject rate.

A still further objective of the present invention is to provide a method of making a hard bias structure for longitudinally biasing a free layer in a MR element according to the first two objectives.

According to a first embodiment, these objectives are achieved by first providing a GMR sensor element with sidewalls and a top surface that is formed on a first gap layer on a substrate in a magnetic read head. The GMR element can have a top spin valve or a bottom spin valve structure that is formed along an ABS plane and is comprised of an AFM layer, a pinned layer, a free layer, and a capping layer. The pinned layer is pinned in a first direction perpendicular to the ABS plane and parallel to the top surface of the substrate by exchange coupling with the magnetized AFM layer. A seed layer with a BCC lattice structure is formed on the first gap layer adjacent to the GMR element. A hard bias structure is formed on a seed layer along each side of the GMR element and contacts a substantial portion of the sidewalls in the GMR element to form abutting junctions with the free layer. In one aspect, the hard bias structure is comprised of a soft magnetic underlayer and an adjoining hard bias layer either above or below the underlayer. The hard bias layer is rigidly exchange coupled with the soft magnetic underlayer to provide a hard bias structure having low anisotropy and a well aligned biasing direction with reduced dispersions.

The hard bias structure is magnetized in a direction orthogonal to that of the pinned layer and parallel to the top surface of the substrate. The hard bias structure is magnetically coupled to the free layer and provides a longitudinal (in-plane) bias that ensures a single magnetic domain within the free layer. Electrical leads are formed above the hard bias structure and contact the GMR element along its sidewalls near the top surface of the capping layer. A second gap layer is formed on the leads and on the GMR element and a second shield layer is formed on the second gap layer to complete the magnetic read head.

In a second embodiment, the magnetic read head includes the same layers as in the first embodiment except that the hard bias structure is laminated such that the magnetic underlayer/hard bias layer configuration is repeated a plurality of times on the seed layer. Thus, the hard bias structure may be represented by [magnetic underlayer/hard bias layer]$_n$ where n is an integer$\geqq$2. The thickness of the individual layers may be adjusted so that the hard bias structure has optimum $H_C$ and $M_r t$ values and provides a stable longitudinal bias to an adjacent free layer in the GMR element.

The present invention is also a method of forming a magnetic read head comprised of an improved hard bias structure according to the first and second embodiments. A stack of GMR layers comprised of a free layer, pinned layer, an AFM layer, and a cap layer is formed on a first gap layer on a substrate by a conventional method. Known methods are also employed to pattern a photoresist mask above the cap layer in the GMR stack. An etch process is used to define a GMR element and a track width. A seed layer is deposited on exposed portions of the first gap layer adjacent to the GMR element. An important step is formation of a hard bias structure on the seed layer and along a substantial portion of the sidewalls on the GMR element. The hard bias structure is formed by a magnetron sputtering or ion beam deposition (IBD) method that forms a soft magnetic underlayer and a hard bias layer above the seed layer.

Alternatively, the hard bias structure may be laminated in which the soft magnetic underlayer/hard bias layer configuration is repeated a plurality of times to form a plurality of stacks represented by [magnetic underlayer/hard bias layer]$_n$ on the seed layer. The thicknesses of the individual layers within the hard bias structure are adjusted to reduce dispersions, provide optimum $H_C$ and Mrt values, and minimize the asymmetry sigma in the output signal during a read operation.

The hard bias structure may be magnetically aligned in a direction parallel to the top surface of the GMR element and parallel to the ABS by applying an external magnetic field during or after the deposition step. Electrical leads are subsequently formed on the hard bias structure by a conventional method. The photoresist layer is then removed by a lift-off process, for example. A second gap layer and second shield layer are sequentially formed on the electrical leads and GMR element by well known methods.

DETAILED DESCRIPTION OF THE INVENTION

The present invention is an improved hard bias structure in a magnetic read head that reduces dispersions of biasing strength along a junction edge with a free layer in a magnetoresistive (MR) element. Although the exemplary embodiments depict a CIP spin valve for a GMR sensor device, those skilled in the art will appreciate that the present invention may also apply to CPP spin valves, magnetic tunnel junction (MTJ) devices, or to multilayer sensor designs based on a GMR or SVMR effect. The drawings are provided by way of example and are not intended to limit the scope of the invention. For example, the shape of a MR element in a magnetic device is not a limitation and the present invention encompasses any configuration where a hard bias structure as described in the first or second embodiment forms an abutting junction with a free layer in the MR element. Moreover, the MR element may be comprised of either a top spin valve or a bottom spin valve. The present invention is also a method of forming a magnetic read head with a hard bias structure wherein a soft magnetic underlayer is rigidly exchange coupled with a hard bias layer to reduce dispersions at an abutting junction with a free layer in a GMR sensor element.

Figure 2:
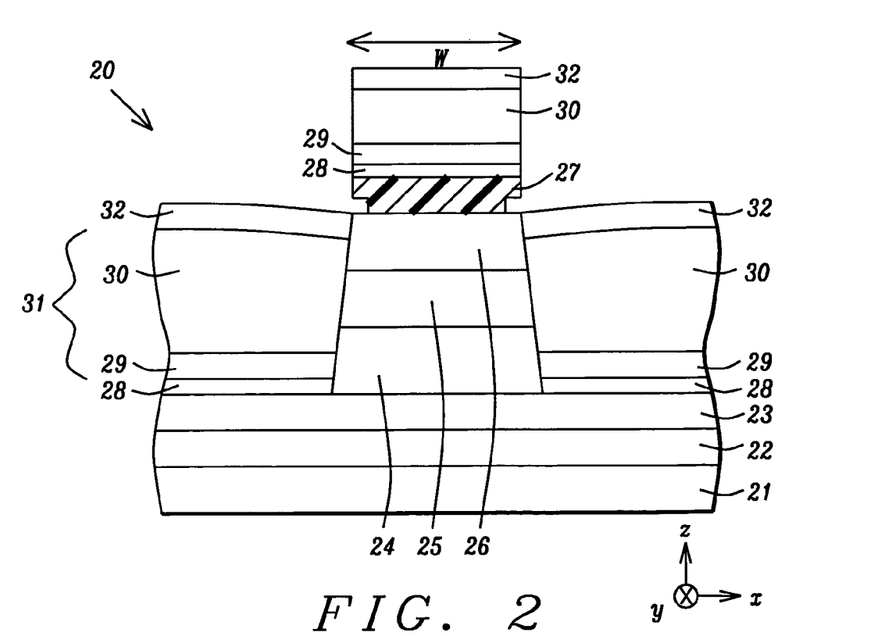
FIG. 2 is a cross-sectional view that shows an intermediate step in the method of forming a hard bias structure in a magnetic read head according to a first embodiment of the present invention.
Figure 3:
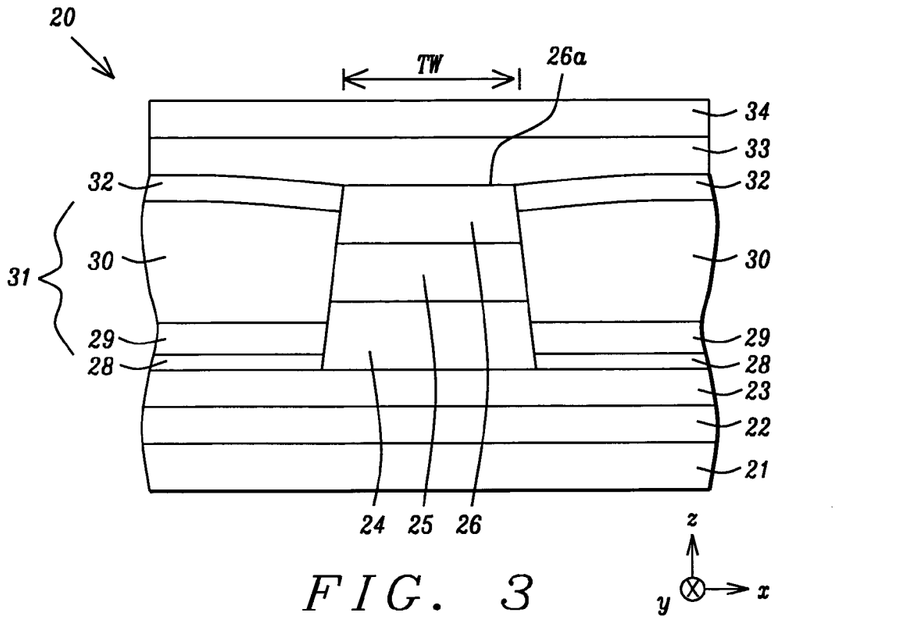
FIG. 3 is a cross-sectional view of a magnetic read head in which a hard bias structure comprised of a soft magnetic underlayer and an overlying hard bias layer is formed on a seed layer and has an abutting junction with a free layer in a GMR element.

A first embodiment is depicted in FIGS. 2-3. Referring to FIG. 2, a cross-sectional view from an ABS plane is shown of a partially completed magnetic read head 20 formed on a substrate 21 that may be a ceramic layer, for example. A first shield layer 22 is formed on the substrate 21 and a first gap layer 23 is formed on the first shield layer by a conventional method. There is a GMR sensor element which is a stack comprised of a bottom portion 24, a free layer 25, and a top portion 26 sequentially formed on the first gap layer 23. The GMR sensor element typically has sloped sidewalls wherein the top portion 26 has a smaller width than the bottom portion 24.

The GMR sensor element is fabricated by sequentially depositing a stack of layers that comprises a bottom portion 24, a free layer 25, and a top portion 26 by an argon sputtering technique, for example, which is well known in the art. A photoresist layer 27 having a width w is patterned on the top portion 26 and then an etch process is used to remove regions of the GMR sensor stack that are not covered by the photoresist layer. The etch stops on the first gap layer 23 which may be $Al_2O_3$ or silicon oxide. Note that the photoresist layer 27 typically has an undercut along both sides at its interface with the top portion 26 of the GMR element to facilitate a subsequent lift-off removal step.

In one embodiment that represents a bottom spin valve, the bottom portion 24 is comprised of a seed layer such as NiCr on which an anti-ferromagnetic (AFM) pinning layer, a pinned layer, and a spacer layer which may be Cu are sequentially formed. The individual layers within the bottom portion 24 are not shown in order to simplify the drawing and direct attention to the abutting junction between the free layer 25 and the subsequently deposited hard bias structure. The AFM layer may be a PtMn or IrMn layer that is magnetized in the y direction. The AFM layer is exchange coupled to the pinned layer that may be comprised of CoFe and which is pinned in the y direction.

Optionally, the pinned layer may have a synthetic antiparallel (SyAP) configuration wherein a coupling layer such as Ru is sandwiched between an AP2 pinned layer on the AFM layer and an overlying AP1 pinned layer. The AP2 layer has a magnetic moment or vector oriented in the y direction by exchange coupling with an AFM pinning layer. The AP1 layer is adjacent to the spacer and is anti-parallel exchange coupled to the AP2 layer via the coupling layer as is understood by those skilled in the art. Thus, the magnetic moment or vector of the AP1 pinned layer is oriented in the "−y" direction which is anti-parallel to the magnetic vector of the AP2 layer. The magnetic moments of the AP2 and AP1 layers combine to produce a net magnetic moment that is less than the magnetic moment of a single pinned layer. A small net magnetic moment results in improved exchange coupling between the AP2 layer and the AFM layer and also reduces interlayer coupling between the AP1 layer and the free layer 25.

The free layer 25 may be comprised of CoFe and/or NiFe, for example, and has a thickness of about 20 to 50 Angstroms. The magnetization of the free layer 25 is oriented in the x direction under the influence of a longitudinal bias from the adjoining hard bias structure which is magnetized in the x direction and will be described in a later section. In the bottom spin valve structure, the top portion 26 of the GMR sensor element is comprised of a cap layer such as Ta or Ru. Optionally, the cap layer may be comprised of more than one layer such as a layer of NiCr on a layer of tantalum oxide.

In an alternative embodiment that represents a top spin valve, the bottom portion 24 may be comprised of a seed layer such as NiCr and an optional buffer layer (not shown) in which a layer of Ru is formed on the seed layer and a copper layer is formed on the Ru layer to provide a lattice match to the overlying free layer 25. The magnetization and composition of the free layer 25 are the same as described previously. Above the free layer in the top portion 26 are sequentially formed a spacer, a pinned layer which may have a SyAP configuration, an AFM layer, and a cap layer. The aforementioned layers have the same composition and magnetization direction as in the previously described bottom portion of the bottom spin valve structure. The layers in the top portion 26 of the top spin valve embodiment are not shown in order to simplify the drawing and direct attention to the abutting junction formed between the free layer 25 and the hard bias structure on either side of the GMR sensor element.

In the presence of an appropriately sized external magnetic field which can be applied when the completed magnetic head 20 (FIG. 3) is passed over a magnetic recording medium in the z direction, the magnetization direction in the free layer 25 switches to the y or −y direction. In a CIP spin valve, the changed magnetic state in the free layer 25 may be sensed by passing a current (such as $I_S$ in FIG. 1) through the GMR sensor element to detect a lower resistance than when the magnetization of the pinned layer and free layer are orthogonal to each other.

Returning to FIG. 2, a seed layer 28 such as CrTi with a thickness between about 10 and 100 Angstroms and preferably about 30 Angstroms is deposited on the first gap layer 23 by a sputtering method or ion beam deposition (IBD). Alternatively, the seed layer 28 may be one of TiW, CrMo, or other materials that have a body centered cubic (BCC) lattice structure and have good lattice matching with a subsequently deposited soft magnetic underlayer and hard bias layer.

An important feature of the present invention is the hard bias structure 31 which is deposited by a sputtering or IBD method on the seed layer 28. In one aspect, the hard bias structure 31 is comprised of a stack of layers including a soft magnetic underlayer 29 (hereafter referred to as underlayer) formed on the seed layer 28 and a hard bias layer 30 disposed on the underlayer. This configuration differs from prior art hard bias structures that typically have a high moment hard bias layer formed on a high $M_s$ underlayer. Preferably, the underlayer 29 has a BCC or face centered cubic (FCC) lattice structure to enable good lattice matching with the seed layer and overlying hard bias (HB) layer. Note that portions of the seed layer, underlayer, and HB layer are formed on the photoresist layer 27 and will be removed in a subsequent process.

In one embodiment, the underlayer 29 is a NiFe layer that has a composition represented by $Ni_R Fe_S$ wherein R and S are the atomic % of Ni and Fe, respectively, and wherein R+S=100, R is from about 30 to 100, and S is between 0 and about 70. Preferably, the thickness of the underlayer 29 is between about 10 to 40 Angstroms but may vary depending upon the desired $M_r t$ value of the hard bias structure and the composition and thickness of the overlying HB layer. The underlayer 29 has a lattice structure intermediate between that of the seed layer 28 and the HB layer 30 in order to provide good lattice matching. Optionally, the underlayer 29 may be made of a soft ferromagnetic material such as CoFe, CoNiFe, FeTaN, FeAlN, or other materials having soft magnetic behavior and good lattice matching with the HB layer 30. Soft magnetic behavior is defined as an $H_C \leq$ about 50 Oersted (Oe) and an $M_S \leq$ about 1200 emu/cc. For instance, the prior art uses a $Co_{15}Fe_{85}$ alloy as a high $M_s$ magnetic layer below a CoPt hard bias layer. In the present invention, an underlayer 29 comprised of a CoFe alloy would preferably contain less than 25% atomic % Fe to produce a "soft magnetic behavior" and thereby enable rigid exchange coupling with the HB layer 30 and a larger process window.

In one embodiment, the HB layer 30 is comprised of a CoCrPt alloy that has a composition represented by $Co_X Cr_Y Pt_Z$ in which X, Y, and Z are the atomic % of Co, Cr, and Pt, respectively, and wherein X+Y+Z=100 and X is from about 50 to 80, Y is between 0 and about 20, and Z is from 0 to about 50. Depending upon the $M_r t$ requirement, the HB layer 30 may have a composition that is 78.6 atomic % Co, 5.2 atomic % Cr, and 16.2 atomic % Pt which is hereafter referred to as $Co_{78.6}Cr_{5.2}Pt_{16.2}$. This composition is typically employed in prior art CoCrPt hard bias layers. The Cr component serves to improve corrosion resistance and magnetic domain structure while the Pt component is used to control coercivity. For example, coercivity may be increased by increasing the Pt content in a CoCrPt layer.

Optionally, the HB layer 30 may have a composition that is 65 atomic % Co, 15 atomic % Cr, and 20 atomic % Pt which is hereafter referred to as $Co_{65}Cr_{15}Pt_{20}$. Since $Co_{65}Cr_{15}Pt_{20}$ has a smaller magnetic moment (about 40% less) than $Co_{78.6}Cr_{5.2}Pt_{16.2}$, a $Co_{65}Cr_{15}Pt_{20}$ layer must be thicker than a $Co_{78.6}Cr_{5.2}Pt_{16.2}$ layer to achieve the desired $M_r t$ value for the hard bias structure. As a result of the thicker $Co_{65}Cr_{15}Pt_{20}$ layer along the junction edge, the junction coverage will be more uniform and the coercivity ($H_C$) of the hard bias layer along the tapered junction edge will be larger. Since $Co_{65}Cr_{15}Pt_{20}$ has smaller anisotropy energy than $Co_{78.6}Cr_{5.2}Pt_{16.2}$, the former tends to have less easy axis dispersions when exchange coupled to a magnetic underlayer.

The thickness of the HB layer 30 is from about 50 to 300 Angstroms and is preferably thicker than the underlayer 29. The thickness may be adjusted to optimize the $H_C$, $M_r t$, and S values for the hard bias structure 31. It is understood that each of the layers in the hard bias structure 31 has an $H_C$, $M_r t$, and S component and that magnetic coupling between the layers produces $H_C$, $M_r t$, and S values for the hard bias structure that influences the adjacent free layer 25 and ensures a single magnetic domain state therein. Note that the CoCrPt alloy of the present invention encompasses a CoPt layer (Y=0) and a CoCr layer (Z=0).

Alternatively, the HB layer 30 may be comprised of another material such as FePt that has a high coercivity and good lattice matching with a magnetic underlayer 29 and with a BCC seed layer 28. Preferably, the HB layer has a minimum $H_C$ value of greater than 1000 Oe and has an Mrt value in the range of about 0.1 to 0.5.

The properties of the hard bias structure of the present invention are very stable with or without annealing. Although no annealing is necessary, the hard bias structure 31 may be annealed by heating substrate 21 at a temperature of about 200° C. to 250° C. in a $N_2$ ambient for a period of about 0.5 to 5 hours.

An electrical lead 32 is deposited by a sputtering or IBD method on the HB layer 30 on each side of the GMR sensor element. Although the leads 32 are connected to the sides of the GMR sensor element on the top portion 26 in the exemplary embodiment, the present invention also anticipates a configuration in which the leads are attached to the top surface 26a (FIG. 3) of the top portion. The leads may be a composite layer in which a thicker conductive layer such as Au or Cu is sandwiched between thinner Ta layers. In one embodiment (not shown), the leads 32 are comprised of a 30 Angstrom thick first Ta layer on the HB layer 30, a 400 Angstrom thick gold or copper layer on the first Ta layer, and a 30 Angstrom thick second Ta layer on the gold or copper layer.

Referring to FIG. 3, a conventional lift-off process is used to remove the photoresist layer 27 and the overlying seed layer 28, soft magnetic underlayer 29, HB layer 30 and the lead layer 32. A track width TW is defined as the distance between the leads 32 on the top surface 26a of the GMR sensor element. A second gap layer 33 is disposed on the leads 32 and top portion 26 and a second shield layer 34 is formed on the second gap layer 33 by conventional methods to complete the magnetic read head 20. The second shield layer 34 preferably has a smooth top surface in order to improve the process latitude for subsequent process steps that could involve a write head fabrication as an example.

TABLE 1

Magnetic Properties of Hard Bias Structure on a 30 Angstrom thick CrTi Seed Layer

| Sample | Hard Bias Structure | Mrt | Hc (Oe) | S | S* |
|---|---|---|---|---|---|
| S1 | NiFe35/($Co_{78.6}Cr_{5.2}Pt_{16.2}$)130 | 1.34 | 1405 | 0.9 | 0.92 |
| S2 | NiFe20/($Co_{78.6}Cr_{5.2}Pt_{16.2}$)130 | 1.17 | 1629 | 0.9 | 0.932 |
| S3 | NiFe30/($Co_{78.6}Cr_{5.2}Pt_{16.2}$)110 | 1.11 | 1360 | 0.88 | 0.923 |
| S4 | [NiFe10/($Co_{78.6}Cr_{5.2}Pt_{16.2}$)45]$_3$ | 1.35 | 1410 | 0.89 | 0.916 |
| S5 | [NiFe15/($Co_{78.6}Cr_{5.2}Pt_{16.2}$)65]$_2$ | 1.32 | 1400 | 0.89 | 0.909 |
| S6 | NiFe15/($Co_{78.6}Cr_{5.2}Pt_{16.2}$)35/ [NiFe10/($Co_{78.6}Cr_{5.2}Pt_{16.2}$)35]$_2$ | 1.11 | 1310 | 0.89 | 0.926 |

Results in Table 1 are from an experiment using a NiFe underlayer with 81 atomic % Ni and 19 atomic % Fe and a lead layer that has the composition Ta25/Au440/Ta150. The inventors have observed that employing a hard bias structure represented by the NiFe/($Co_{78.6}Cr_{5.2}Pt_{16.2}$) configuration as a biasing component for a free layer in a GMR sensor element results in magnetic properties which are similar to those obtained when a conventional hard bias structure is used. In particular, a high squareness (S) value and a high coercive force angle ratio (S*) are maintained in all samples. Additionally, $M_r t$ (shown as memu/cm$^2$ units) may be fine tuned by adjusting the thicknesses of the magnetic underlayer and hard bias layer. Although coercivity ($H_C$) is slightly reduced compared with some conventional hard bias structures, the $H_C$ values exhibited by samples S1-S3 representative of the first embodiment and by samples S4-S6 that represent laminated structures of a second embodiment (described in a later section) are large enough for practical applications.

As a result of the rigid exchange coupling between the soft magnetic underlayer and the hard bias layer, anisotropy is reduced and biasing direction is less random than in prior art hard bias structures. Since the easy axis dispersions of biasing strength are quite small for all samples in Table 1, a more uniform biasing strength is applied along the junction edge with the free layer, leading to smaller asymmetry sigma at a constant output signal of about 1.1 mV and better performance than associated with conventional hard bias structures. The inventors have also discovered that the NBLW reject rate is improved by implementing the hard bias structure of the present invention in a magnetic read head manufacturing scheme. Because of less easy axis dispersions, the biasing strength exerted on the free layer is more uniform and head noise is reduced.

Another advantage provided by the present invention is that a higher process window is realized when forming the hard bias structure because of the ability to fine tune $M_r t$ and $H_C$ and due to a lower magnetic moment of soft magnetic underlayer such as NiFe compared with typical underlayers. In other words, by simultaneously optimizing $M_r t$ and $H_C$, small differences in the thickness of the layers within the hard bias structure 31 caused by manufacturing variations will have a minimal effect on $M_r t$ and $H_C$. Also, a thickness change in a low moment underlayer will have a smaller effect on $M_r t$ for the hard bias structure than a similar thickness variation in a higher moment underlayer like $Fe_{85}Co_{15}$ in prior art.

The present invention also encompasses an embodiment wherein the layer order in the hard bias structure is comprised of a hard bias layer on the seed layer and a soft magnetic underlayer disposed on the hard bias layer. For instance, the HB layer 30 may be formed on the seed layer 28 and the soft magnetic underlayer 29 may be disposed on the HB layer.

A second embodiment will now be described in which a hard bias structure formed adjacent to a free layer in a magnetoresistive (MR) element is comprised of a laminated hard bias structure. In the exemplary embodiment pictured in FIGS. 4-5, the hard bias structure is formed in a magnetic read head and adjacent to a GMR sensor element that was described previously in the first embodiment. However, the second embodiment also encompasses any configuration where a hard bias structure described herein forms an abutting junction with a free layer in a MR element.

Figure 4:
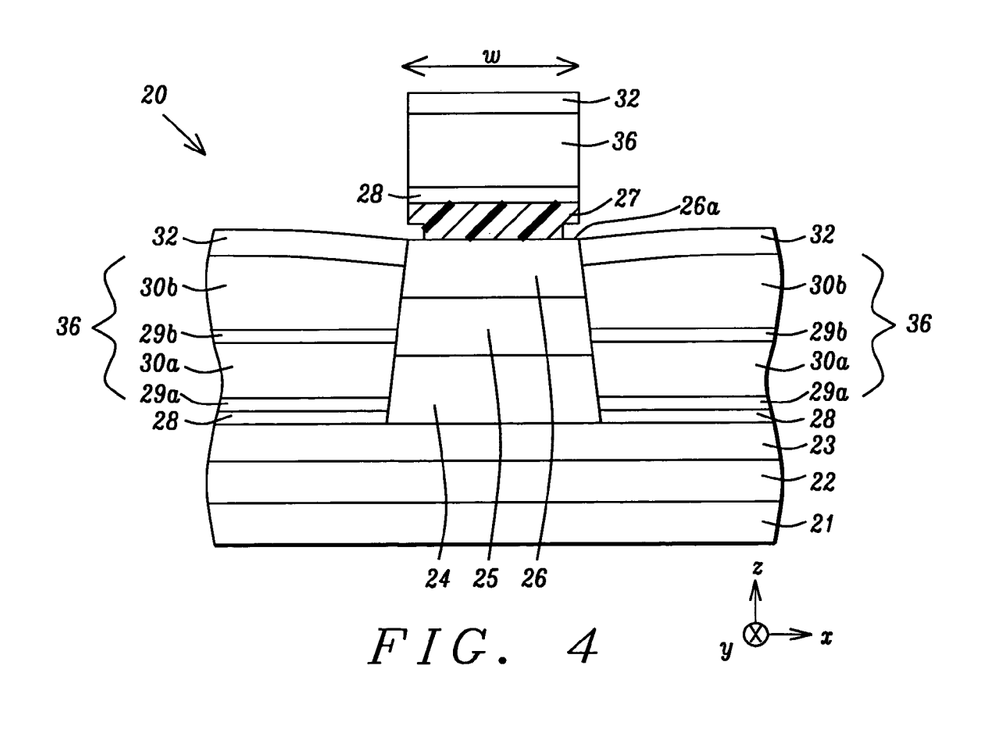
FIG. 4 is a cross-sectional view that depicts an intermediate step in the method of forming a laminated hard bias structure in a magnetic read head according to a second embodiment of the present invention.

Referring to FIG. 4, a first shield layer 22 and a first gap layer 23 are provided on a substrate 21 as previously described. Likewise, a GMR sensor element comprised of a bottom portion 24, a free layer 25, and a top portion 26 is then fabricated on the first gap layer according to a method described in the first embodiment in which a patterned photoresist layer 27 having a width w serves as an etch mask. A seed layer 28 comprised of CrTi with a thickness of about 30 Angstroms is deposited on the exposed regions of the first gap layer 23 by a sputtering or IBD process. Alternatively, the seed layer 28 may be one of TiW, CrMo, or another material that has a body centered cubic (BCC) lattice structure and good lattice matching with a subsequently deposited underlayer and hard bias layer.

An important feature of the present invention is the hard bias structure 36 which is formed on the seed layer 28. In one aspect, the hard bias structure 36 is made of laminated layers in which a stack comprised of a soft magnetic underlayer and a hard bias (HB) layer on the underlayer is repeated two or more times to form a plurality of stacks on the seed layer. For example, a bottom layer in a second stack is formed on the top layer of a first stack and so forth. In the exemplary embodiment, a second stack of two layers is formed on a first stack of two layers. However, more than two stacks of layers may be formed as appreciated by those skilled in the art. The laminated hard bias structure 36 is fabricated by a conventional means which may involve magnetron sputtering or IBD processes, for example.

The first stack of two layers in the hard bias structure 36 consists of a soft magnetic underlayer 29a and a HB layer 30a. In one aspect, the underlayer 29a is a NiFe layer that has a composition represented by $Ni_R Fe_S$ wherein R and S are the atomic % of Ni and Fe, respectively, and wherein R+S=100, R is from about 30 to 100, and S is between 0 and about 70. Alternatively, the underlayer 29a may be comprised of a ferromagnetic material such as CoFe, CoNiFe, FeTaN, FeAlN, or other materials having soft magnetic behavior as defined previously and providing good lattice matching with the HB layer 30a. Preferably, the thickness of the underlayer 29a is from about 10 to 40 Angstroms but may vary depending upon its composition, the desired $M_r t$ of the hard bias structure, the number of stacks employed, and the thickness and composition of the HB layers in the stacks. The underlayer 29a has a soft magnetic character with an $H_C$ less than about 50 Oe and an $M_s$ less than about 1200 emu/cc. Moreover, the underlayer has a lattice structure intermediate between that of the seed layer 28 and the HB layer 30a in order to provide good lattice matching.

In one embodiment, the HB layer 30a has a thickness from about 20 to 100 Angstroms and is comprised of a CoCrPt alloy that has a composition represented by $Co_X Cr_Y Pt_Z$ in which X, Y, and Z are the atomic % of Co, Cr, and Pt, respectively, and wherein X+Y+Z=100 and X is from about 50 to 80, Y is between 0 and about 20, and Z is from 0 to about 50. Preferably, the thickness of the HB layer 30a is greater than the underlayer 29a thickness and depends on the number of stacks and the desired $H_C$, Mrt, and S values for the laminated hard bias structure. The HB layer 30a may be a $Co_{78.6}Cr_{5.2}Pt_{16.2}$ layer or a $Co_{65}Cr_{15}Pt_{20}$ layer, depending on the $M_r t$ target value for the laminated hard bias structure. Optionally, the HB layer 30a may be comprised of another material such as FePt that has a high coercivity and good lattice matching with a soft magnetic underlayer 29a and with a BCC seed layer 28. It is understood that each of the layers in the laminated hard bias structure 36 has a $H_C$, Mrt, and S component and that magnetic coupling between the layers produces $H_C$, Mrt, and S values for the laminated hard bias structure that influences the adjacent free layer 25 and ensures a single magnetic domain state therein.

A second stack of layers is formed on the HB layer 30a and is comprised of a second underlayer 29b and a second HB layer 30b. The composition and thickness of the second underlayer 29b and second HB layer 30b may be the same as the composition and thickness of the underlayer 29a and HB layer 30a, respectively, as indicated by Sample 5 in Table 1. The hard bias structure 36 may have a third stack of layers (not shown) comprised of a lower third underlayer formed on the second HB layer 30b and an upper third HB layer. In an embodiment where three stacks of layers are formed in a laminated hard bias structure, the second underlayer 29b and third underlayer may have the same thickness and composition as underlayer 29a. Likewise, the second HB layer 30b and the third HB layer may have the same thickness and composition as HB layer 30a as shown for Sample 4 (Table 1).

The present invention also encompasses an embodiment wherein the layer order of the hard bias layers and magnetic underlayers is reversed. In this case, the first HB layer 30a is formed on the seed layer 28 and the first underlayer 29a is disposed on the first HB layer. Furthermore, the second HB layer 30b is formed on the first underlayer 29a and the second underlayer 29b is disposed on the second HB layer. Optionally, a plurality of HB layers and underlayers represented by the configuration [HB layer/magnetic underlayer]$_n$ is formed on the seed layer 28 where n is an integer $\geq 2$.

In a laminated hard bias structure where there are a plurality of stacks as described above, the present invention also anticipates that the second underlayer 29b (or third underlayer) may have a different composition than underlayer 29a. Furthermore, the second HB layer 30b (or third HB layer) may have a different composition than the HB layer 30a. For instance, the second HB layer 30b may be comprised of a $Co_{65}Cr_{15}Pt_{20}$ layer while the HB layer 30a may be comprised of a $Co_{78.6}Cr_{5.2}Pt_{16.2}$ layer. Additionally, the thickness of the second underlayer 29b (or third underlayer) may differ from that of underlayer 29a. Likewise, the thickness of the second HB layer 30b (or third HB layer) may differ from that of HB layer 30a. For example, Sample S6 (Table 1) represents an embodiment wherein the underlayer 29a is a NiFe layer that is 15 Angstroms thick and the second underlayer 29b is a NiFe layer which is 10 Angstroms thick. Note that Sample S6 also has a third underlayer (10 Angstroms thick NiFe layer) and that all three HB layers are 35 Angstroms thick.

In summary, the thickness and composition of each of the layers in the plurality of stacks in the laminated hard bias structure of the present invention may be adjusted to provide optimum $H_C$ and $M_r t$ values. Moreover, at least one of the HB layers in the laminated hard bias structure 36 forms an abutting junction with the free layer 25.

Although no annealing is necessary to stabilize the properties of the layers within the laminated hard bias structure 36, the plurality of stacks may be annealed by heating the substrate 21 at a temperature of about 200° C. to 250° C. in a $N_2$ ambient for a period of about 0.5 to 5 hours.

Electrical leads 32 are formed on the laminated hard bias structure 36 by a conventional process. In one embodiment, the leads 32 are comprised of a composite Ta/Au/Ta layer in which a 30 Angstrom thick first Ta layer is sputter deposited on the hard bias structure 36, a 400 Angstrom thick Au layer is sputter deposited on the first Ta layer, and a 30 Angstrom thick second Ta layer is sputter deposited on the Au layer. Optionally, Cu may be used in place of Au in the lead layer or other conductive materials may be used to form the electrical leads. Although the leads 32 are shown connected to the sides of the top portion 26 of the GMR sensor element, the invention also encompasses a configuration in which the leads are attached to the top surface 26a and sides of the top portion as appreciated by those skilled in the art.

Figure 5:
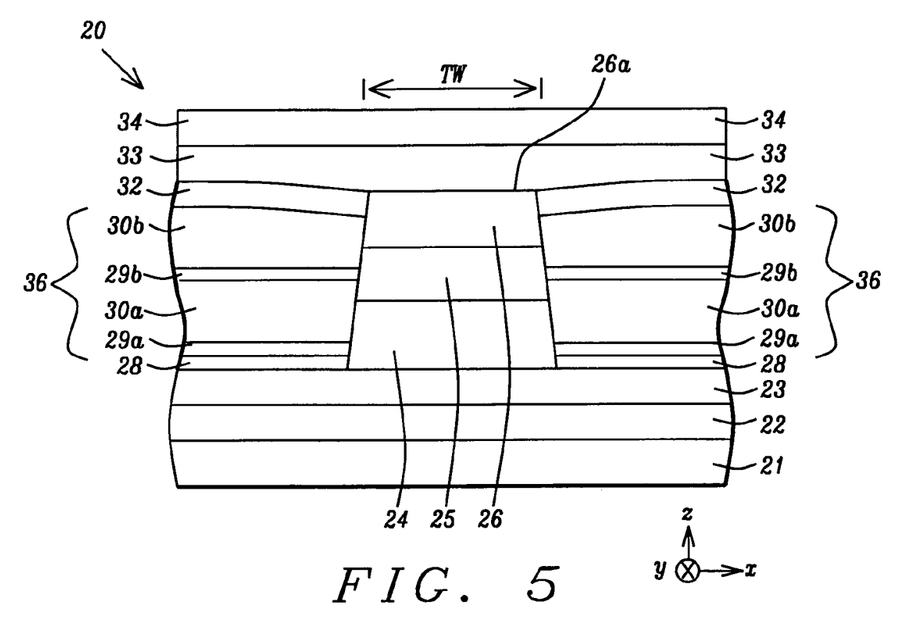
FIG. 5 is a cross-sectional view of a magnetic read head in which a laminated hard bias structure comprised of a [soft magnetic underlayer/hard bias layer]$_n$ configuration is formed adjacent to a GMR element according to the second embodiment.

Referring to FIG. 5, the photoresist layer 27 and overlying portions of seed layer 28, hard bias structure 36, and lead 32 are removed by a well known lift off process to leave the top surface 26a of the top portion 26 exposed between the leads 32. A second gap layer 33 is deposited on the leads 32 and top portion 26 as described previously. Subsequently, a second shield layer 34 is formed on the second gap layer 33 according to the process included in the first embodiment.

The advantages of the second embodiment including larger process window, lower NBLW reject rate, and improved output asymmetry are the same as described in the first embodiment. Returning to Table 1, the laminated samples S4-S6 exhibit nearly the same magnetic properties as non-laminated samples S1-S3 for a similar film thickness in the hard bias structure as shown by the comparison of S1 to S5 or by comparing S3 to S6. There is more flexibility in the second embodiment because the thickness and composition of each of the layers in the plurality of stacks may be adjusted to fine tune $M_r t$, $H_C$, S, and S*. Moreover, the easy axis dispersions of biasing strength are expected to be even smaller in the laminated samples because each of the HB layers is rigidly exchange coupled to a soft, low $H_K$ NiFe layer. As a result, an improved performance of the domain stabilization within the free layer in the GMR sensor element is achieved and output asymmetry is reduced during a read operation.

While this invention has been particularly shown and described with reference to, the preferred embodiment thereof, it will be understood by those skilled in the art that various changes in form and details may be made without departing from the spirit and scope of this invention.

We claim:

1. A method of forming a hard bias structure in a magnetic read head based on an MR element, comprising:
   (a) providing a substrate on which an MR element having a top surface and two sides and that is comprised of a free layer which has two sidewalls coincident with said sides is formed;
   (b) forming a seed layer on said substrate and adjacent to a portion of each side of said MR element; and
   (c) forming a hard bias structure on the seed layer wherein the hard bias structure is comprised of:
      (1) a soft magnetic underlayer made of FeTaN or FeAlN; and
      (2) a hard bias layer that forms an abutting junction with the free layer on each side of the MR element; said hard bias layer is rigidly exchange coupled with the soft magnetic underlayer and thereby provides optimum $H_C$ and $M_r t$ values to ensure a well aligned biasing direction to minimize dispersions at the abutting junctions, and said hard bias layer is comprised of FePt or $Co_x Cr_y Pt_z$ in which X, Y, and Z are the atomic % of Co, Cr, and Pt, respectively, and wherein X+Y+Z=100 and X is from about 50 to 80, Y is between 0 and about 20, and Z is from 0 to about 50.

2. The method of claim 1 further comprised of forming an electrical lead on the hard bias structure on each side of the MR element wherein each electrical lead contacts said MR element and a space between said electrical leads defines the track width of said magnetic read head.

3. The method of claim 1 wherein said soft magnetic underlayer and hard bias layer form a hard bias structure that has a coercivity ($H_C$) and an $M_r t$ value which provides a longitudinal bias to ensure a single magnetic domain in said free layer.

4. The method of claim 1 wherein the seed layer is comprised of CrTi, TIW, CrMo, or other materials having a BCC lattice structure a thickness of about 10 to 100 Angstroms.

5. The method of claim 1 wherein said substrate is a first gap layer in said magnetic read head.

6. The method of claim 1 wherein the soft magnetic underlayer has a magnetic moment less than about 1200 emu/cc and a thickness between about 10 and 40 Angstroms.

7. The method of claim 1 wherein the hard bias layer has a thickness from about 50 to 300 Angstroms.

8. The method of claim 7 wherein a $Co_{65}Cr_{15}Pt_{20}$ layer is deposited as the hard bias layer to optimize coverage at the abutting junctions and thereby produce a higher coercivity of the hard bias structure at said abutting junctions.

9. A method of forming a laminated hard bias structure in a magnetic read head based on an MR element, comprising:
   (a) providing a substrate on which an MR element having a top surface and two sides and that is comprised of a free layer which has two sidewalls coincident with said sides is formed;
   (b) forming a seed layer on said substrate and adjacent to a portion of each side of said MR element;
   (c) forming a stack of magnetic layers on the seed layer on each side of the MR element wherein the stack is comprised of:
      (1) a soft magnetic underlayer made of FeAlN or FeTaN; and
      (2) a hard bias layer that is rigidly exchange coupled with the soft magnetic underlayer, said hard bias layer is comprised of FePt or $Co_x Cr_y Pt_z$ in which X, Y, and Z are the atomic % of Co, Cr, and Pt, respectively, and wherein X+Y+Z=100 and X is from about 50 to 80, Y is between 0 and about 20, and Z is from 0 to about 50; and
   (d) repeating step (c) one or more times to form a plurality of stacks on the seed layer wherein at least one stack forms an abutting junction with the free layer on each side of the MR element, said hard bias structure provides optimum coercivity and $M_r t$ values to ensure a well aligned biasing direction to minimize dispersions at the abutting junctions with the free layer.

10. The method of claim 9 further comprised of forming an electrical lead on the hard bias structure on each side of the MR element wherein each electrical lead contacts said MR element and a space between said electrical leads defines the track width of said magnetic read head.

11. The method of claim 9 wherein each soft magnetic underlayer and hard bias layer in the hard bias structure has a thickness that is adjusted to provide a longitudinal bias that ensures a single magnetic domain in said free layer.

12. The method of claim 9 wherein the seed layer is comprised of CrTi, TiW, CrMo, or other materials having a BCC lattice structure and a thickness of about 10 to 100 Angstroms.

13. The method of claim 9 wherein said substrate is a first gap layer in said magnetic read head.

14. The method of claim 9 wherein the soft magnetic underlayers in the laminated hard bias structure have a magnetic moment less than about 1200 emu/cc and each has a thickness between about 10 and 40 Angstroms.

15. The method of claim 9 wherein the hard bias layers in the laminated hard bias structure have a thickness from about 20 to 100 Angstroms.

16. The method of claim 15 wherein the hard bias layers are comprised of $Co_{65}Cr_{15}Pt_{20}$ to optimize coverage at the abutting junctions and thereby produce a higher coercivity of the hard bias structure at said abutting junctions.

17. The method of claim 9 wherein the thickness of a soft magnetic underlayer in one stack is different than the thickness of a soft magnetic underlayer in a second stack.

18. The method of claim 9 wherein the thickness of a hard bias layer in one stack is different than the thickness of a hard bias layer in a second stack.

* * * * *

UNITED STATES PATENT AND TRADEMARK OFFICE
CERTIFICATE OF CORRECTION

PATENT NO. : 7,515,388 B2
APPLICATION NO. : 11/016506
DATED : April 7, 2009
INVENTOR(S) : Kunliang Zhang et al.

It is certified that error appears in the above-identified patent and that said Letters Patent is hereby corrected as shown below:

Title page Inventors item (75) delete second inventor "Mao-Min Chen, S. J. CA (US)" and replace with -- Mao-Min Chen, San Jose, CA (US) --.

Signed and Sealed this

Ninth Day of June, 2009

JOHN DOLL
*Acting Director of the United States Patent and Trademark Office*